United States Patent [19]
Gezari et al.

[11] Patent Number: 5,463,972
[45] Date of Patent: Nov. 7, 1995

[54] HIGH-PERFORMANCE SEATING/SUPPORT SYSTEM

[75] Inventors: Walter A. Gezari, Calverton; Christopher J. Marotta, Riverhead, both of N.Y.

[73] Assignee: Stidd Systems, Inc., Greenport, N.Y.

[21] Appl. No.: 160,394

[22] Filed: Dec. 1, 1993

[51] Int. Cl.⁶ ..................................................... B63B 17/00
[52] U.S. Cl. ............................................ 114/363; 297/363
[58] Field of Search ............................ 114/363; 297/337, 297/338

[56] References Cited

U.S. PATENT DOCUMENTS 4,425,863  1/1984  Cutler ........................................ 114/363
4,934,303  6/1990  Lathers et al. ........................... 114/363

FOREIGN PATENT DOCUMENTS 1384467  3/1988  U.S.S.R. ................................. 114/363

Primary Examiner—Jesus D. Sotelo
Attorney, Agent, or Firm—Schweitzer Cornman & Gross

[57] ABSTRACT

A seating system especially well adapted for use in high-speed and high-performance water craft provides improved support for a user, in both standing and sitting positions. The seating system includes a fixed base upon which is mounted a frame positionable and lockable in a chosen forward/aft position. The frame supports independent backrest and seat units, each of which is independently vertically positionable along the frame. The seat unit further includes bolster and seat portions which are pivotable between a first position in which the seat portion is operative and a second position in which the seat portion hangs downwardly, in an inoperative orientation, and where the bolster provides support for the standing occupant.

16 Claims, 8 Drawing Sheets

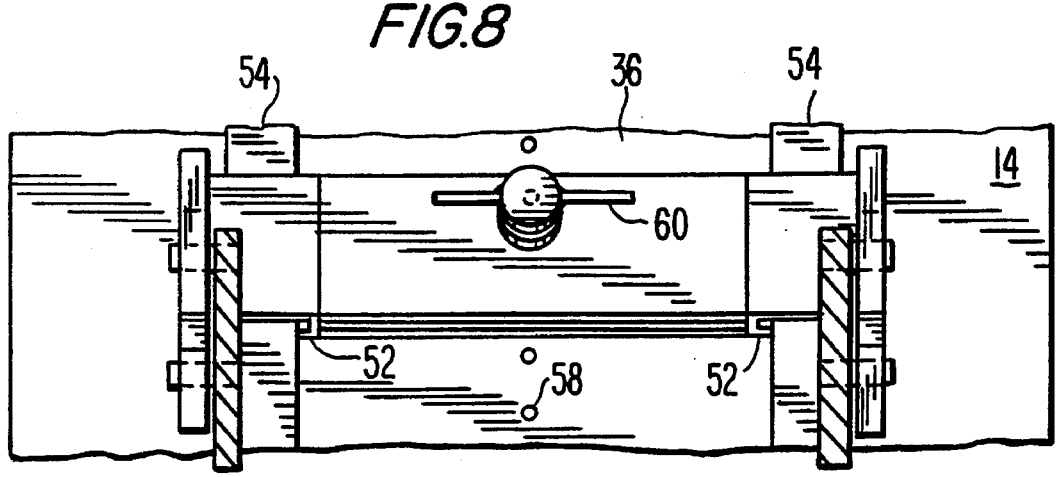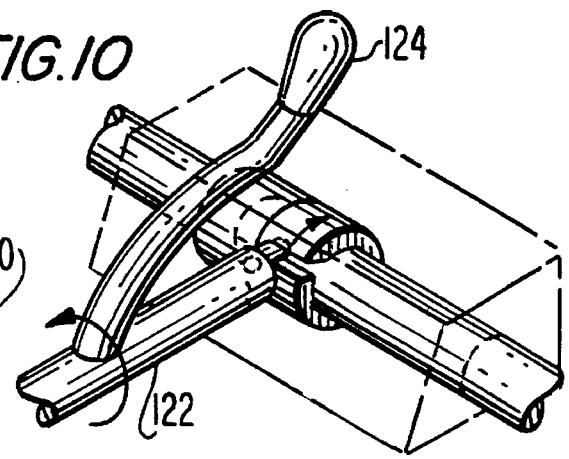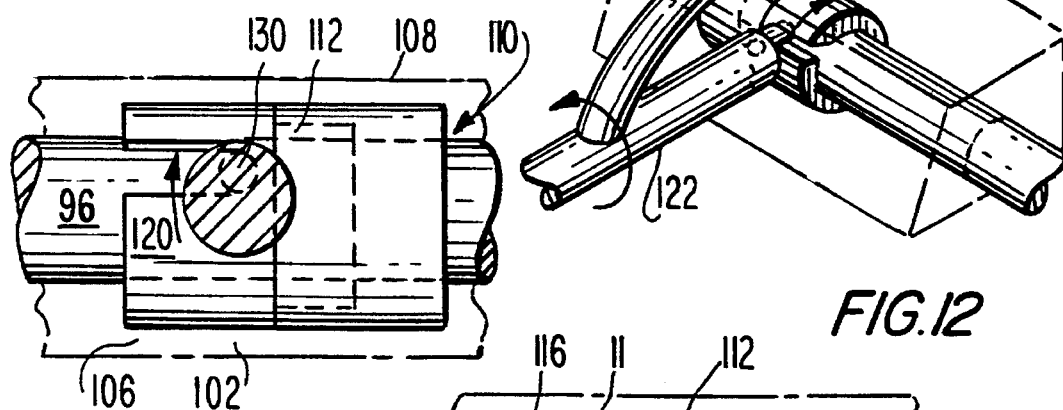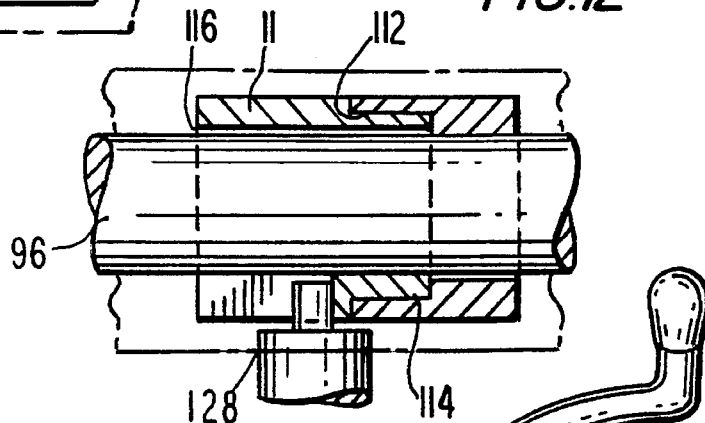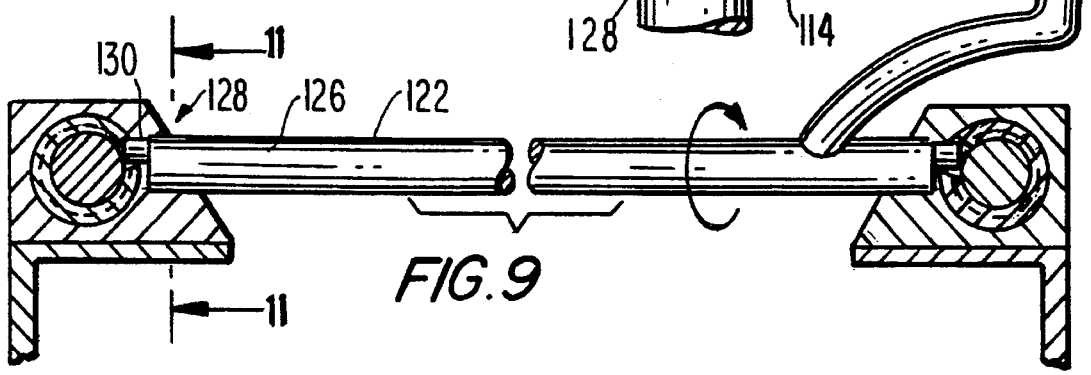

HIGH-PERFORMANCE SEATING/SUPPORT SYSTEM

The present invention relates to a seat system and, more particularly, to a seat and support unit particularly adapted for use in high-speed and high-performance water-borne vehicles.

BACKGROUND OF THE INVENTION

Modern boat technology has progressed to the point where powered water crafts are capable of high sustained speeds in a variety of water conditions. The high level of forces exerted upon such crafts and their occupants, both crew and passengers, make it imperative that the occupants are adequately restrained and maintained in their seats and at their stations.

The boat's operating crew, in particular, must remain at their assigned posts to perform their necessary functions irrespective of the operating conditions of the boat. Whether the captain and his crew man their positions in a standing or sitting position, it is necessary that they be provided with a securely retained linkage, while maintaining the ability to perform their assigned tasks. Indeed, any seating system utilized should preferably have the ability to support the user both in a seated, as well as standing, position, and be able to be quickly and easily converted between such two configurations.

Further, the seating system should further be able to adjust to accommodate the varying physical characteristics of individuals likely to use the seating system. Accordingly, provision should be made for individual adjustment of both the seat and backrest portion of the seat system when in the seat configuration, as well as the points of support when the system is used by an individual in the standing position.

Adjustability of the system must also accommodate forward and rear positioning. Such positioning should advantageously be accomplished in a rapid and positive manner, through an apparatus which is easy to operate and not prone to failure.

Still further, as space is often at a premium in high-performance vessels, it is advantageous to provide integral storage capabilities for the seat system, which capabilities are not compromised by adjustments in the system to meet the physical attributes of the user or in conversion of the system from seated to standing support.

BRIEF DESCRIPTION OF THE INVENTION

In accordance with the above and other objects and purposes, a seat system is provided in which individually positionable seat and backrest elements are mounted to a upper seat frame. The upper seat frame itself is mounted for forward and aft positioning with respect to a rigid and fixed lower seat frame which is typically bolted or otherwise firmly affixed to the boat deck. The upper frame unit may be provided with adjustable armrests, pivotable about a generally horizontal axis among a plurality of positions, in which the armrest may be locked. A lock assembly provides for an actuator at the distal end of the armrest, coupled to the locking mechanism at the point of pivot.

Fore and aft positioning and locking is preferably accomplished by mounting the upper seat frame on linear travel bushings which ride on a pair of parallel rods. The locking mechanism consists of pairs of eccentric elements through which the rods extend. The rotation of one of the eccentric elements over a relatively short angle engages the rod and thus locks the seat assembly in position. By use of a lever arrangement, relatively high torque can be applied to the eccentric, providing for a positive lock with a minimum of effort.

In order to accommodate both seating and standing personnel, the seat assembly of the unit includes both a seat portion and a bolster which, in the seat orientation, provides support for the user's lower back. The seat assembly is pivotally mounted to the upper frame, and is pivotable in a downward direction to an orientation in which the seat portion is generally vertical, the bolster portion projecting outward to serve as a lower support point for a standing user. The pivoting function is preferably obtained by use of a novel pivoting lock assembly in which the lifting of the seat assembly disengages the lock and allows pivoting to the second lower position in which the lock is reengaged by gravity. A subsequent lift of the assembly, followed by a pivoting action to the horizontal position and subsequent drop, returns the unit to the first locked position.

The upper frame is advantageously constructed in a manner by which the thickness of the seat frame provides a storage space.

A fuller understanding of the present overall invention, as well as each of the constituent inventive parts thereof, will be accomplished upon review of the following detailed description of a preferred, but nonetheless illustrative embodiment thereof, when review in connection with the annexed drawings, wherein:

FIG. 8 is a sectional elevation view taken along line 8—8 of FIG. 2, detailing the means by which the seat unit is vertically positioned;

FIG. 9 is a sectional elevation view taken along line 9—9 of FIG. 2 detailing the control means for fore and aft movement of the seat unit;

FIG. 10 is a perspective view of the lock mechanism for fore and aft movement;

FIG. 11 is a sectional elevation view taken along line 11—11 of FIG. 9 depicting lock mechanism;

FIG. 12 is a cut-away plan view of the lock mechanism;

DETAILED DESCRIPTION OF THE PREFERRED EMBODIMENT

Figure 1:
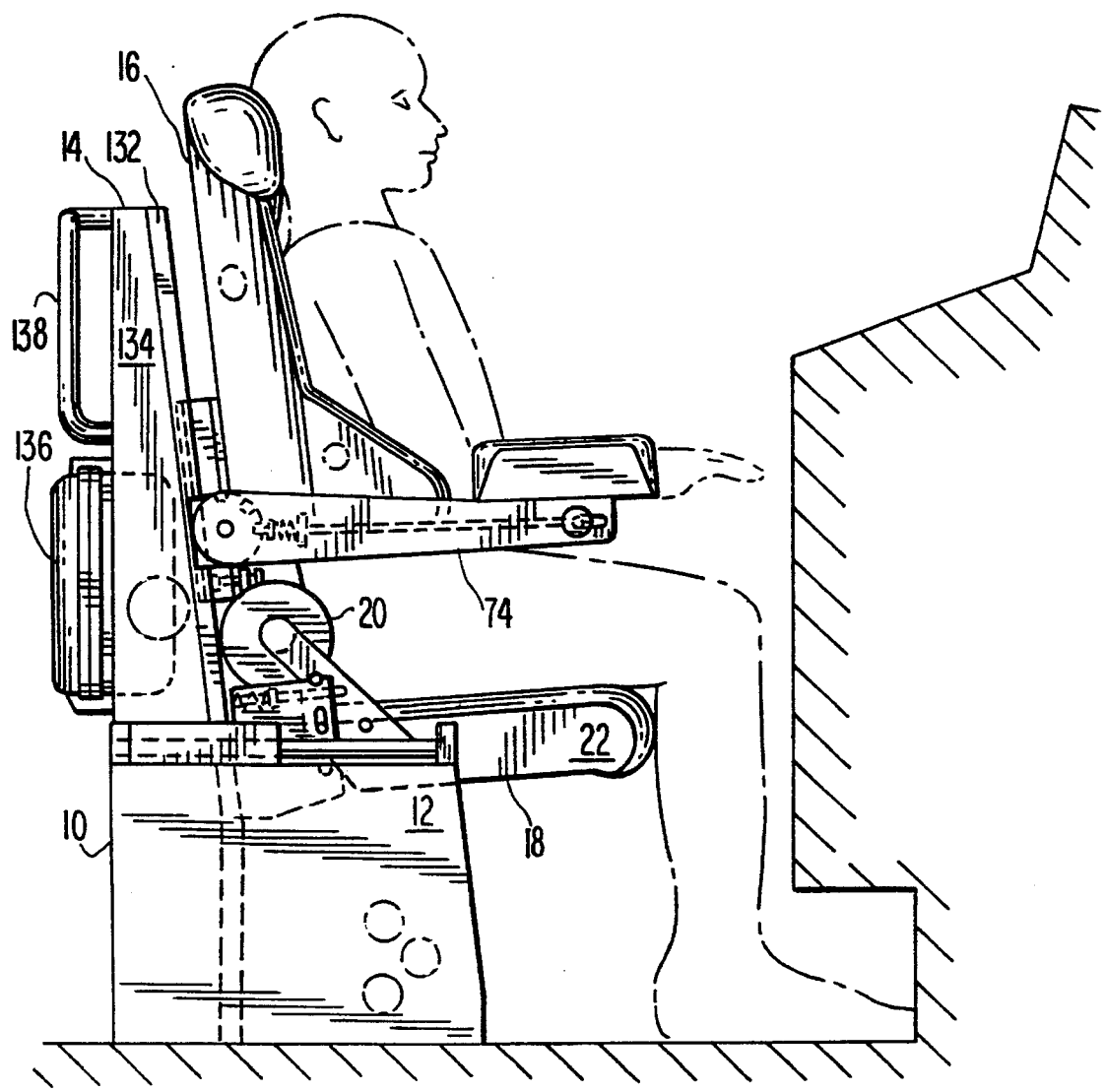
FIG. 1 is a right side elevation view of a seat unit embodying the present invention, showing a user in the seated position.
Figure 2:
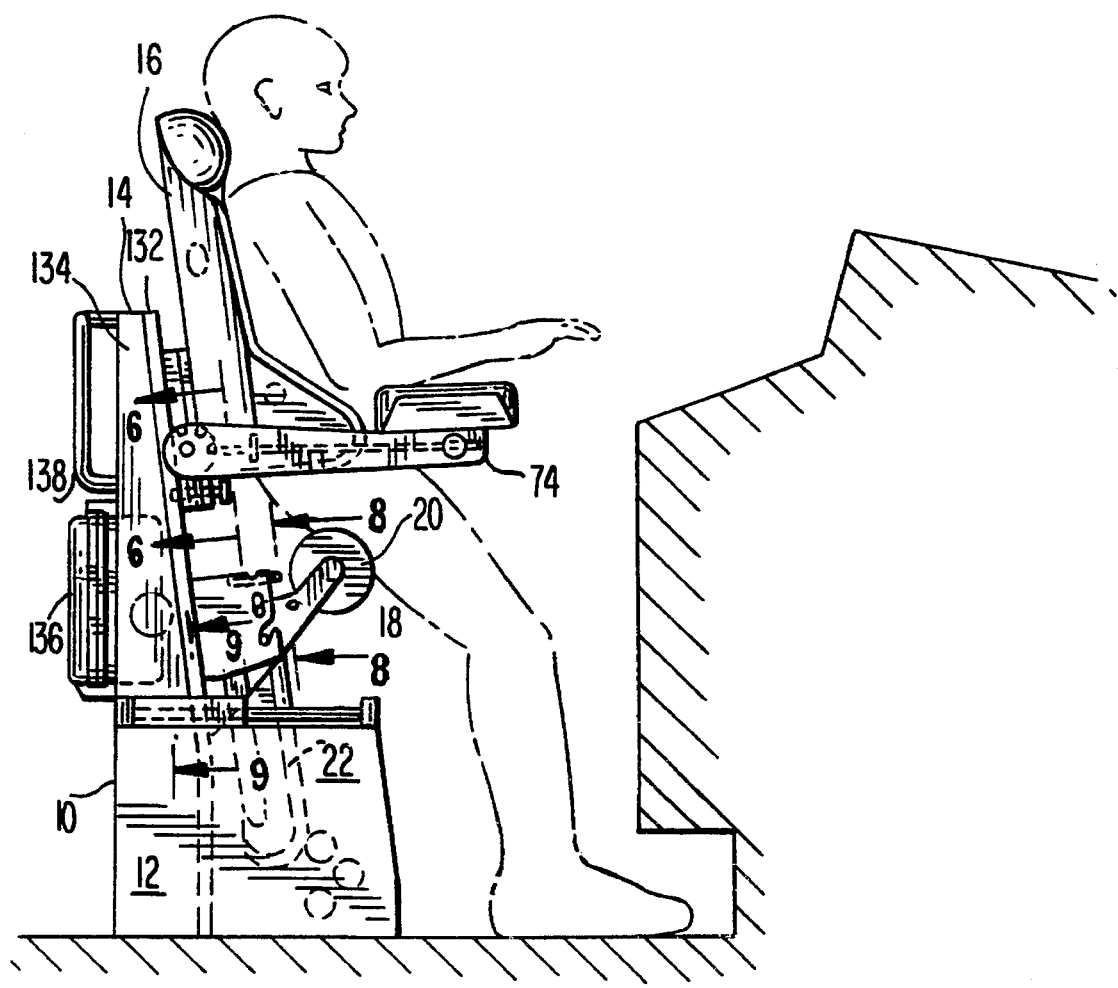
FIG. 2 is a right side elevation view of the seat unit in the position for support of a standing user.
Figure 3:
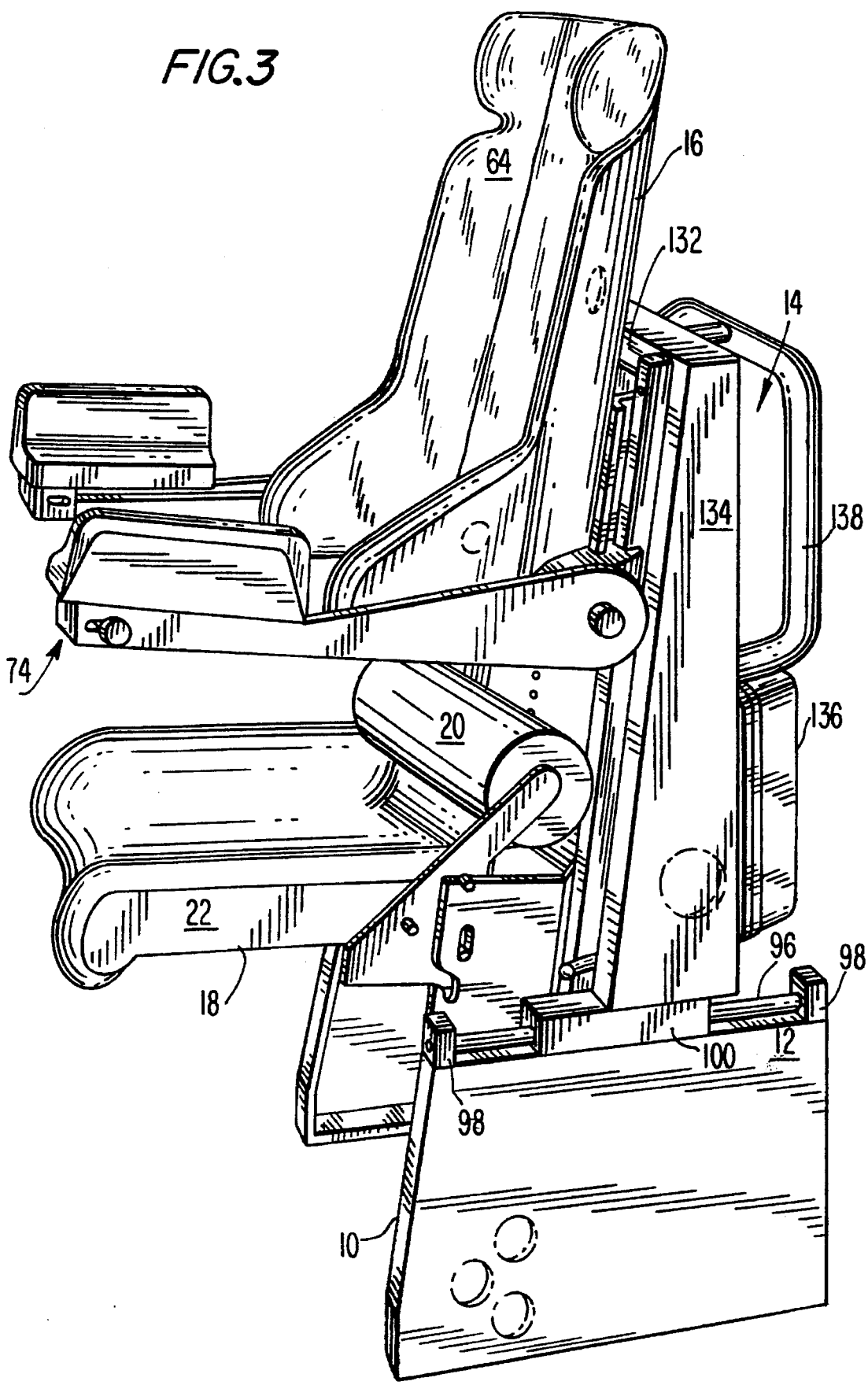
FIG. 3 is a left side perspective view of the seat unit.

Referring initially to FIGS. 1 through 3, a seat system in accordance with the present invention includes a base 10 adapted to be bolted or otherwise rigidly affixed to the boat deck. The base may be formed with a pair of parallel, forwardly extending sides 12 adapted to be secured to the deck, joined by a transverse crossmember. Mounted upon the top of the base for forward and aft positioning is upper support frame 14, to which both backrest unit 16 and combination seat/bolster unit 18 are affixed.

Both the backrest unit and seat/bolster unit are individually mounted to the upper support frame, allowing each to be individually vertically positioned to accommodate a variety of individuals. In a first position, as shown in FIGS. 1 and 3, the cushioned bolster 20 of the seat/bolster unit 18 is in general alignment with the backrest unit 16, and provides lumbar stabilization for the user while the seat 22 projects outwardly from the upper frame in a generally horizontal direction, serving as a conventional seating element. Both the seat and backrest unit are provided with removable cushions as known in the art.

As may be seen with reference to FIGS. 13–17 the bolster and seat 20, 22, are supported by a generally L-shaped seat support assembly 24, which is pivotally mounted to a seat carriage 26 which is mounted directly to the upper frame 12. The seat support assembly 24 includes a seat pan 28, to which a seat cushion is affixed, and a bolster tube 30, about which a bolster cushion is mounted. A pair of opposed side wall portions 32, which may each be formed of a pair of parallel plates, join the seat pan and bolster tube. These units, as well as the other structural parts of the seat unit, may be crafted of aluminum, finished or unfinished as desired, with weight reduction holes placed as appropriate and needed.

Figure 14:
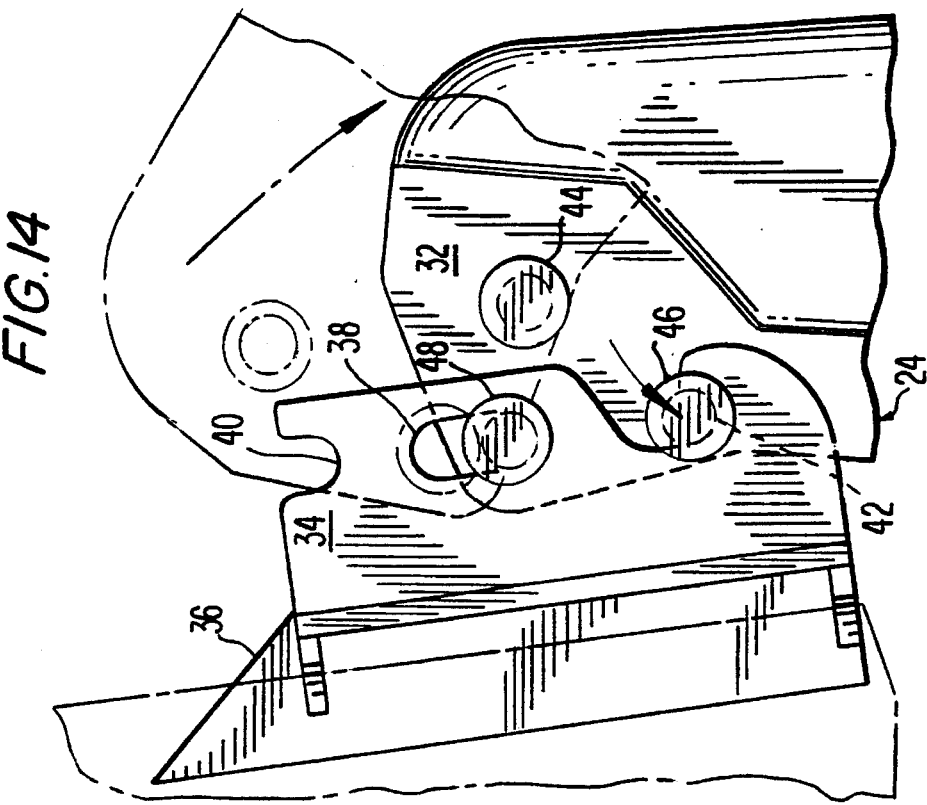
FIGS. 13 and 14 are detail schematic views of the operation of the seat/bolster unit.
Figure 13:
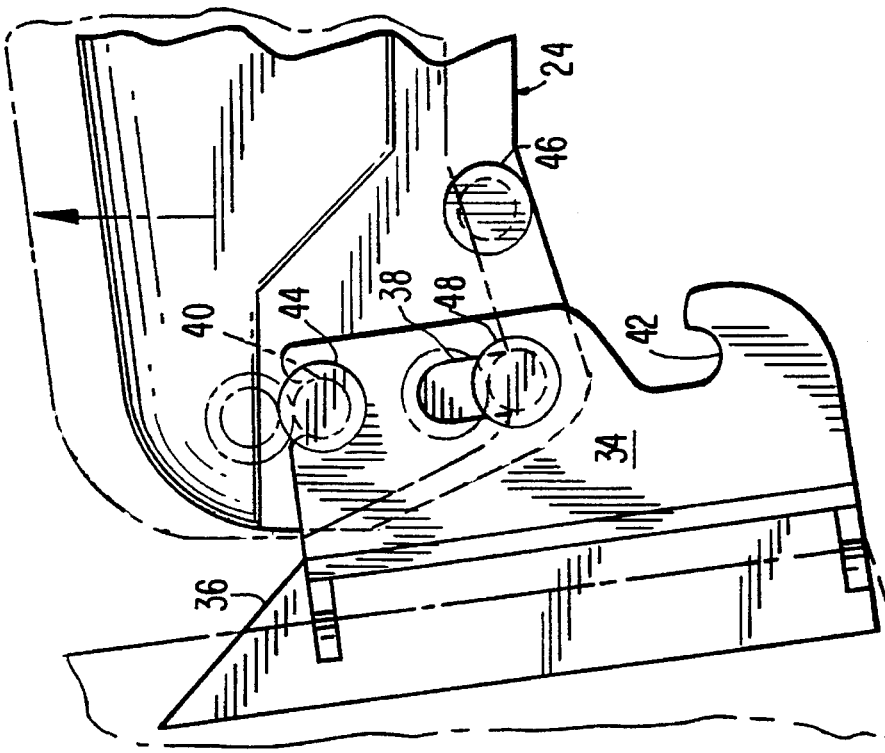
Figure 15:
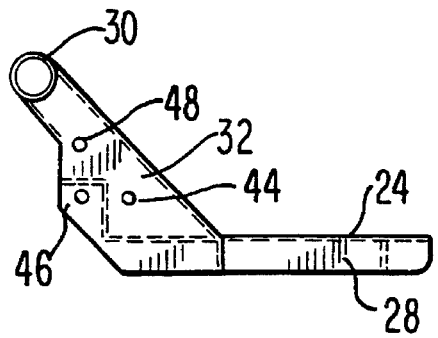
FIGS. 15 and 16 are, respectively, elevation and plan views of the seat support assembly.
Figure 16:
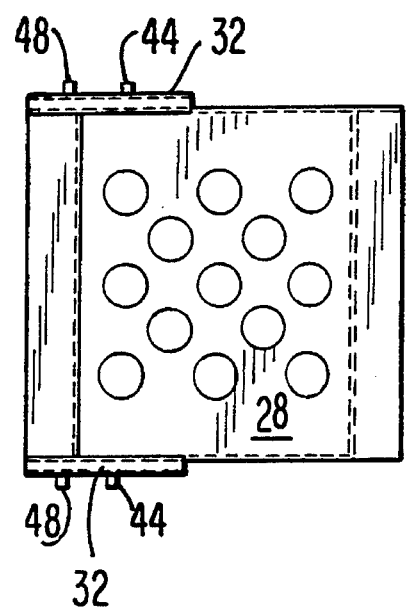
Figure 17:
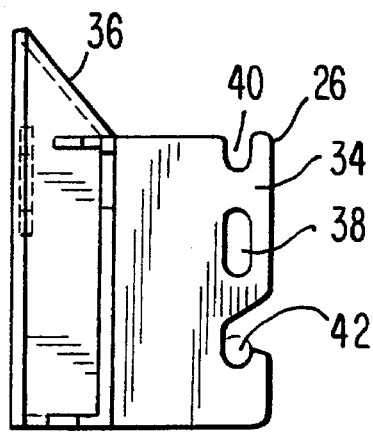
FIGS. 17 and 18 are, respectively elevation and plan views of the seat carriage.
Figure 18:
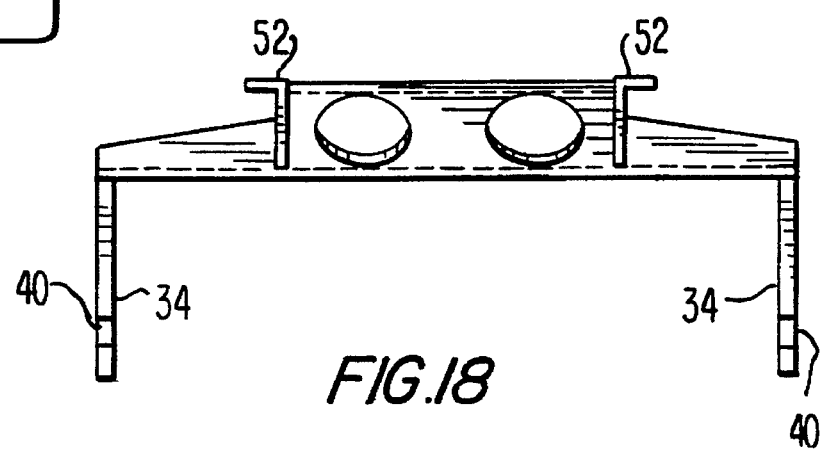

The seat support assembly 24 is pivotally mounted to the seat carriage 26 in a manner which provides secure positioning for the assembly in a first position, as shown in FIGS. 1, 3 and 13, in which the seat 22 is in the operative, horizontal position, as well as in a second position, depicted in FIGS. 2 and 14, in which the seat support assembly is pivoted approximately 90 degrees, whereby the bolster 20 is forward of the backrest, providing a support for the upper legs and buttocks of a standing user, while the seat 22 extends downwardly, between the base sidewalls 12, into an inoperative and retracted orientation.

The seat carriage 26, as seen in FIGS. 13, 14, 17 and 18, includes a pair of parallel plates or arms 34 mounted to a backplate portion 36. Each of the arms 34 includes a vertical slot 38 as a pivot point for the seat support assembly 24, as well as a pair of notches 40, 42. Locking pins 44, 46, which preferably include low-friction Nylatron bushings as known in the art, extend outwardly from each of the seat assembly sidewalls 32, and alternatively engage one of the notches 40, 42 to lock the seat assembly in one of the two alternative positions, while a pivot pin 48, similarly provided with a low-friction bushing, projects through the slot 38 of the carriage arm to define the rotation axis for the seat support assembly.

In the first position, as depicted in FIGS. 1, 3 and 13, the locking pins 44 are captured by the upper notches 40 on the carriage arms 34, maintaining the seat assembly with the seat horizontal. Lifting the seat support assembly upwardly, the pivot pins 48 moving up within the slots 38, disengages the pins 44 from engagement with the slots 40, and allows the seat assembly to rotate about the pins 48 into the lowered position as shown in FIG. 2. In such a position, the center of the bolster tube 30 is about 5.25 inches forward of the slots 38. The locking pins 44 rotate into the mouths 50 in the carriage arms, allowing the pins to be captured by the lower notches 42, supporting the seat assembly in the second position as shown in FIGS. 2 and 14. In either position, the seat support assembly is maintained in position by the mass of the seat assembly acting downward, retaining the appropriate pins in the respective notches.

The seat carriage 26, and mounted seat/bolster assembly 18, is vertically-positionable along the upper frame 14. As detailed in FIGS. 8 and 18, the backplate portion 36 of seat carriage 26 includes a pair of outwardly extending slide plates 52. These plates are each embraced by a rail assembly 54 extending vertically along upper frame 14, and form a track upon which the slides, and thus the seat carriage, can travel. The rails may be faced with thin layers of a low friction substance, such as acetal plastic, as glide strips. A series of bores 58 extend vertically along the centerline of the upper frame, a spring-loaded plunger/handle 60 being mounted to the seat carriage back for selective engagement with a bore to lock the seat carriage in position as desired. Typically, the bores may be on one inch centers, allowing for a minimum range of adjustment for the seat carriage. In addition to allowing adjustment of the seat/bolster assembly, they also allow positioning of the back support unit 16, as will be discussed. Preferably, the inner face of the upper frame upon which the seat carriage and back support unit rides is canted rearwardly at about 8 degrees from the vertical to maintain proper flexion of the lumbar spine.

Figure 7:
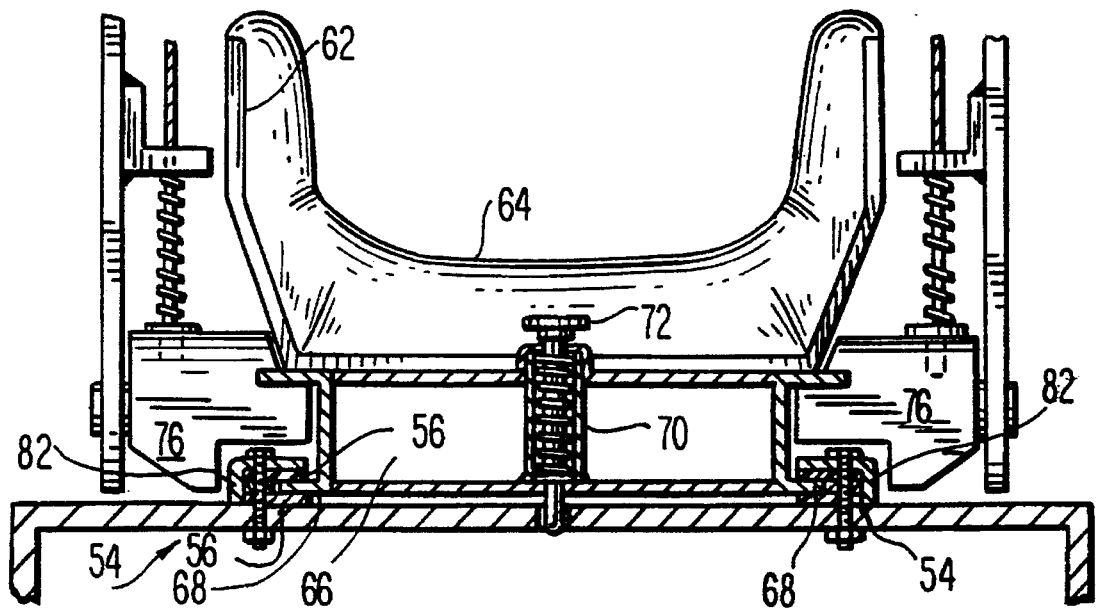
FIG. 7 is a sectional plan view taken along line 7—7 of FIG. 6;.

With reference to FIGS. 1, 3, 6 and 7, the backrest unit 16 comprises a backrest pan 62, contoured to wrap around the sides of the user and to which the backrest cushions 64 are mounted, affixed to a back carriage frame 66. The back carriage frame includes a pair of slide plate portions 68, which similarly engage the rail assemblies on the upper frame 14 to allow vertical positioning of the backrest unit. A plunger unit 70 is mounted to the frame, with plunger/handle 72 engaging a chosen bore in the upper frame for positioning of the backrest unit, preferably over a range of about 16 inches. As seen in FIG. 7, the rail assemblies 54 include an L-shaped member 82 bolted to the upper frame, defining a pair of inwardly directed slots into which the slide plates of both the back carriage frame 66 and seat carriage 26 project. The inner faces of the apertures may be supplied with the plastic glide strips 56.

Figure 4:
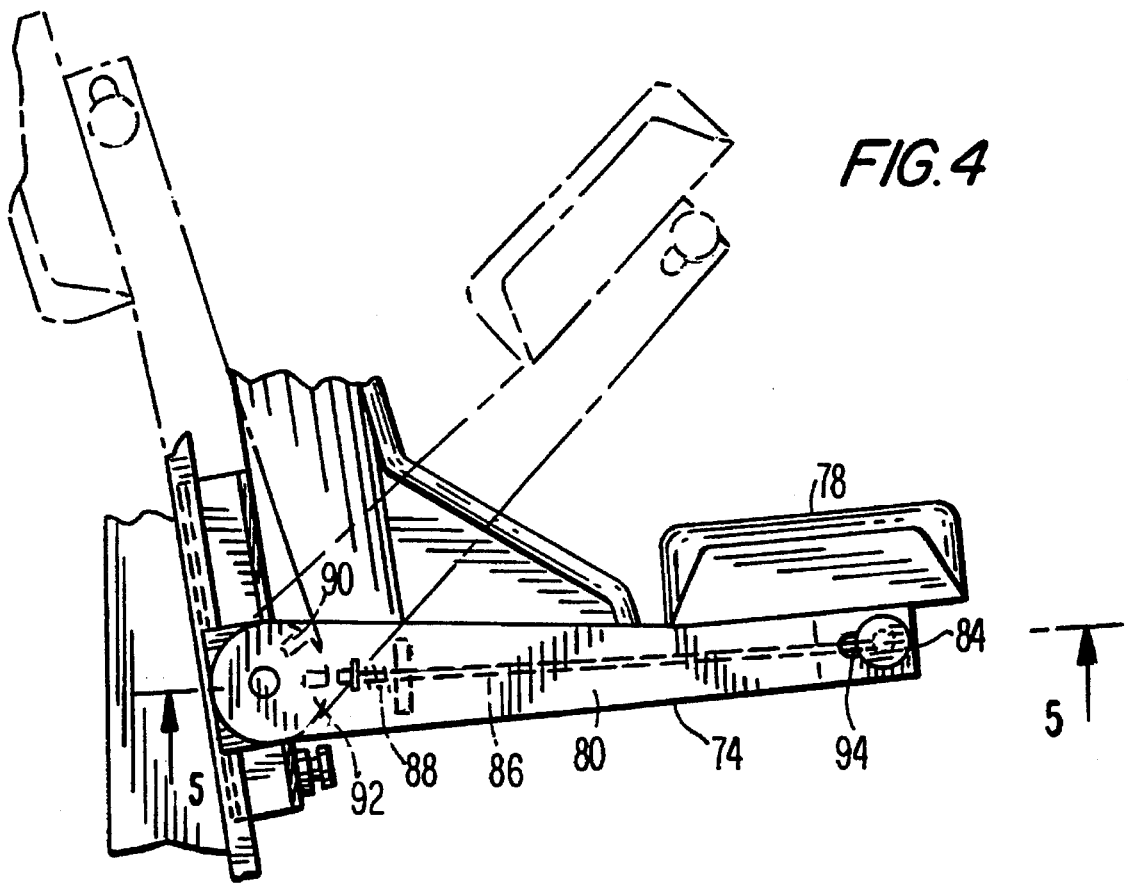
FIG. 4 is a detail elevation view of the armrest portion of the seat unit.
Figure 5:
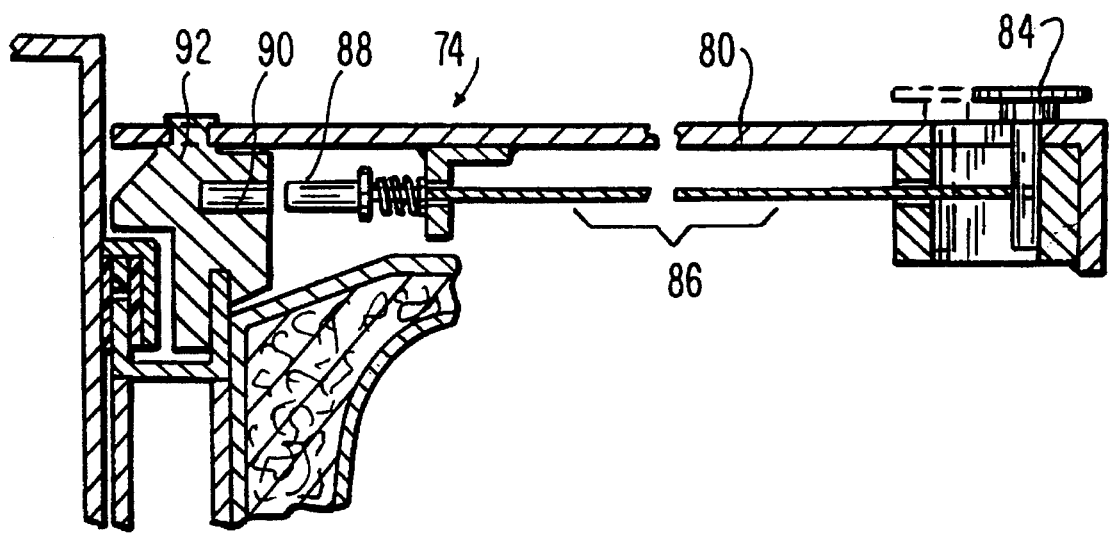
FIG. 5 is a sectional elevation view taken along line 5—5 of FIG. 4.
Figure 6:
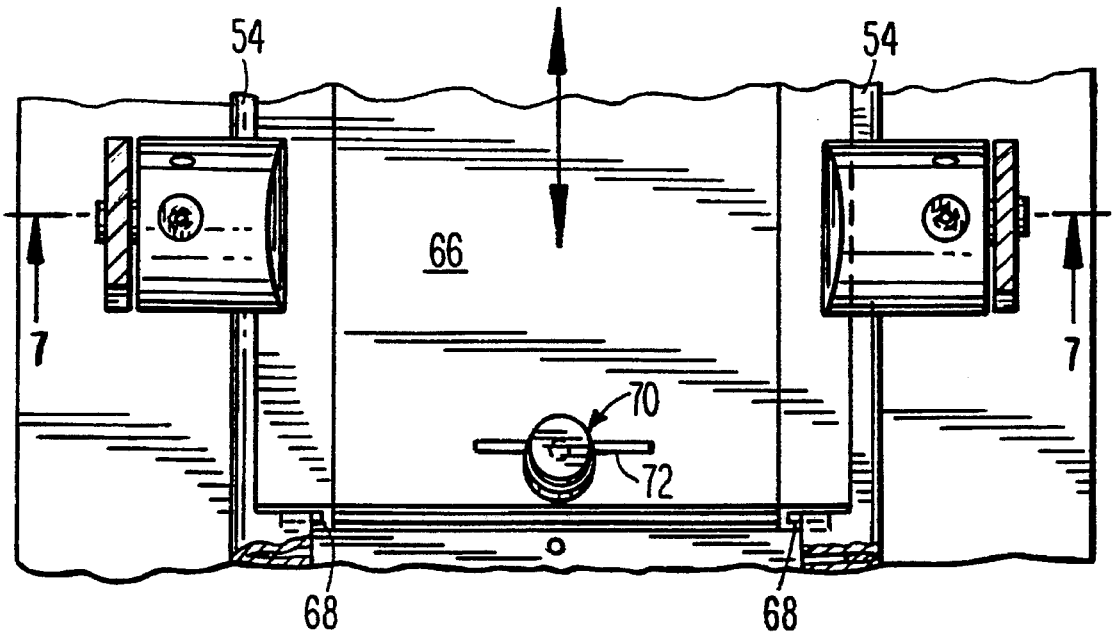
FIG. 6 is a partial elevation view taken along line 6—6 of FIG. 2 detailing the means by which the backrest is vertically positioned.

The backrest unit 14 also includes a pair of armrests 74, each pivotally mounted to an arm box 76 formed as part of the backrest pan and carriage frame assembly, as seen in FIG. 7. As further detailed in FIGS. 4 and 5, each armrest includes a contoured armrest pad 78 affixed to the upper surface of the distal end of an armrest arm 80. The armrest pad may include a lateral fin portion along its outer margin to augment forearm support. The armrests are canted inwardly about 6 degrees to conform to normal resting radio-ulnar orientation. A control mechanism actuator 84, projecting outwardly from the distal end of the armrest arm, allows release of a locking mechanism located at the proximal end of the arm, allowing the arm to be pivoted upwardly from the position shown in the Figures to a plurality of predetermined positions. The actuator may be connected by a biased rod or cord to a plunger 88, which mates with apertures 90 in hub 92 to allow the arm to be rotated and locked in position. As shown, the actuator may be in a slot 94 to allow locking/release travel.

To allow fore and aft motion of the upper frame and mounted backrest and seat units, each of the base sidewall units 12 has a slide rod 96 mounted upon its top surface, supported at its end by a pair of blocks 98, as seen in FIG. 3. The rods may be of chrome plated, case hardened steel having a diameter of one inch, chosen to be able to support the weight of the seat assembly and occupant when subjected to the torques and forces developed by high seas. The length of the rods are about 17 inches.

By placement of the rods at the top of the base, spaced from the deck, the torques and forces exerted upon the slide system by the seat system and user are significantly lessened over conventional placement of adjustment means at near deck level. In addition, such location allows the adjustment means to be positioned more conveniently for the operator.

A further unique feature of the present invention is the mechanism by which the seat system may be positioned along the rods and locked to the base. As further depicted in FIG. 3, the upper frame 14 is supported upon the rods 96 by mounting blocks 100, which includes linear travel bearings for the rods as known in the art, as well as a locking mechanism which allows the seat unit to be simultaneously locked in position along both rods, and which is depicted in FIGS. 9–11.

As depicted therein, an eccentric lock 102 is provided for each rod. Each lock consists of a pair of eccentric elements 104 and 106. The first eccentric element 104 is affixed within an eccentric bearing block or housing, which in turn is mounted in mounting block 100 and accepts a rod 96 therethrough through bore 110, which is placed eccentrically with respect to the major axis of the element. The offset between the center of the element and the center of the bore may be 0.045 inches. A second bore portion 112, concentric with the major axis of the element, abuts a face of the element, and is dimensioned to accept one end of the second eccentric element 106.

The second eccentric element 106 includes a stepped cylindrical body, having an end portion 114 dimensioned to mate with the second bore portion 112 in the first eccentric element 106. The outer diameter of the end portion may be approximately 1.311 inches, the second bore portion 112 of the first eccentric element having a similar inner diameter to allow the first eccentric element to rotate therein. A circular through bore 116, also dimensioned to accept the rod 96, extends through the second element, and is eccentric to the major axis and center of the element, the offset being about 0.045 inches. A longitudinally extending slot 118 is provided in the sidewall of portion 120 of the second eccentric element.

It is to be appreciated that relative rotation between the two eccentric elements causes the eccentric throughbores 110 and 116 through which the rail extends to change the relative positions of their respective centers, thus binding against the rod extending therethrough. With the first eccentric element 104 being fixed in bearing block 108, rotation of the second eccentric element 106 binds and locks the bearing block and thus the upper frame in a fixed position along the rod.

Lock and release is carried out by use of a locking bar unit 122, which includes a handle portion 124 which extends outwardly from the side of the seating system. The handle is affixed to a lock rod 126, the opposed ends of which each extend into an eccentric bearing block 108 through a bore 128 to engage the slot 118 in the second eccentric element 106. Each end of the lock rod is provided with an offset circular end portion 130, which serves as a cam element to the second eccentric elements 110, causing the second eccentric element to rotate within the bearing block when the handle is rotated as shown in FIG. 10. By such rotation both eccentric locks are simultaneously engaged or disengaged against the slide rods.

As seen in FIGS. 1–3, the upper frame 14 of the seat system may be constructed with a front wall 132 and rearwardly-extending side walls 134, whereby a chamber is defined between the side walls. By use of appropriate dividers this chamber can be utilized for the storage of items, such as case 136. In addition, a handrail 138 may be affixed to the upper frame, allowing personnel passing the seal system or standing behind it a secure handhold.

It is to be appreciated that the seat system of the present invention provides improved comfort and security for a user, whether in a standing or seated position. Modification and adaptation to the apparatus as set forth herein may be accomplished by those skilled in the art without departing from the scope of the invention, which is set forth in the accompanying claims.

We claim:

1. An improved boat seating apparatus comprising an upright base adapted to be mounted to a deck and having an upper portion; a frame mounted to said upper portion; a track extending upwardly along said frame; adjustment means mounted to said frame and said base to permit fore and aft positioning of said frame with respect to said base; and back and seat supports, each mounted to said frame and individually positionable along said track.

2. The apparatus of claim 1, wherein said upper portion of said base includes a pair of parallel, spaced top surfaces, said adjustment means comprising a first rail mounted to one of said top surfaces and a second rail mounted to the other top surfaces; and bearings mounted to said frame adapted for travel along said rails.

3. The apparatus of claim 2 further comprising means for locking said frame in position with respect to said base.

4. The apparatus of claim 3, wherein said locking means comprise at least one compound eccentric bearing engageable with one of said rails mounted to said frame.

5. The apparatus of claim 4, wherein said compound eccentric bearing comprises a pair of eccentric sleeves, each of said sleeves having a circular bore extending eccentrically therethrough for passage of a rail, said sleeves being mounted for relative eccentric rotation of said bores, whereby the axes of said bores may be offset to cause engagement with the rail extending therethrough.

6. The apparatus of claim 5, wherein one of said sleeves is fixed to said frame, the other of said sleeves being rotatable with respect thereto, said compound bearing further comprising an actuating arm connected to said other of said sleeves for rotation thereof.

7. The apparatus of claim 6, wherein said actuating arm comprises a cam end engaging said other sleeve for rotation.

8. The apparatus of claim 1, wherein said seat support comprises a seat frame and seat and bolster elements mounted to said seat frame.

9. The apparatus of claim 8, wherein said seat frame includes first and second generally perpendicular portions, said seat element being mounted to said first portion and said bolster being mounted to said second portion.

10. The apparatus of claim 9, wherein said seat frame is pivotally mounted to said frame.

11. The apparatus of claim 10 further comprising orientation means mounted to said frame and said seat frame to allow said seat support to be oriented in first and second operative positions, said first operative position having said seat element extending forwardly from said frame, said second operative position having said bolster extending forwardly from said frame.

12. The apparatus of claim 10, wherein said orientation means comprise detents located on said frame and detent pins mounted to said seat support.

13. The apparatus of claim 1, wherein said frame includes a generally vertically-extending back portion comprising front and rear walls forming a storage cavity therebetween.

14. The apparatus of claim 1 further comprising a pair of armrests and pivot means mounted to said frame and a front end of each of said armrests for selective rotation of said armrests with respect to said frame.

15. The apparatus of claim 14 further comprising lock means for individually maintaining each of said armrests in one of a plurality of positions with respect to said frame.

16. The apparatus of claim 15, wherein said lock means comprise a lock control actuator located at a distal end of said armrest operatively coupled to a lock pin at said pivot means.

* * * * *